(12) United States Patent
Mu

(10) Patent No.: US 9,978,249 B1
(45) Date of Patent: May 22, 2018

(54) METHOD, DEVICE, AND SYSTEM FOR MONITORING TAXI

(71) Applicant: BOE TECHNOLOGY GROUP CO., LTD., Beijing (CN)

(72) Inventor: Xinxin Mu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days. days.

(21) Appl. No.: 15/567,960

(22) PCT Filed: Apr. 5, 2017

(86) PCT No.: PCT/CN2017/079462
§ 371 (c)(1),
(2) Date: Oct. 19, 2017

(87) PCT Pub. No.: WO2017/177849
PCT Pub. Date: Oct. 19, 2017

(30) Foreign Application Priority Data

Apr. 13, 2016 (CN) .......................... 2016 1 0228556

(51) Int. Cl.
*G08B 21/24* (2006.01)
*B60C 9/00* (2006.01)

(52) U.S. Cl.
CPC ................ *G08B 21/24* (2013.01); *B60C 9/00* (2013.01)

(58) Field of Classification Search
CPC .................................................... G08B 21/24
See application file for complete search history.

(56) References Cited

U.S. PATENT DOCUMENTS

| 2017/0098364 A1* | 4/2017 | Jaegal ...................... B60Q 9/00 |
| 2017/0284148 A1* | 10/2017 | Bradley .................. E05F 15/70 |

FOREIGN PATENT DOCUMENTS

| CN | 101520938 A | 9/2009 |
| CN | 101937609 A | 1/2011 |
| CN | 102343682 A | 2/2012 |
| CN | 202257872 U | 5/2012 |
| CN | 202394343 U | 8/2012 |
| CN | 103310597 A | 9/2013 |

(Continued)

OTHER PUBLICATIONS

Chinese Search Report, for Chinese Patent Application No. 201610228556.5, dated Sep. 22, 2016, 9 pages.

(Continued)

*Primary Examiner* — Laura Nguyen
(74) *Attorney, Agent, or Firm* — Kinney & Lange, P.A.

(57) ABSTRACT

In the embodiments of the present invention, by respectively acquiring a first mass of a taxi when the taxi stops running in an empty state, a second mass of the taxi when the taxi is switched from the empty state to a passenger carrying state, a third mass of the taxi when the taxi is switched from a running state to a stopped state in the passenger carrying state, and a fourth mass of the taxi when the taxi is switched from the empty state to the passenger carrying state; and comparing a first difference between the first mass and the fourth mass with a second difference between the second mass and the third mass, if the first difference is less than the second difference, then it is determined that a passenger's article is left in the taxi and thus an alarm in the taxi will be triggered to warn.

11 Claims, 2 Drawing Sheets

(56) References Cited

FOREIGN PATENT DOCUMENTS

| CN | 103679821 A | | 3/2014 |
|---|---|---|---|
| CN | 104118355 A | | 10/2014 |
| CN | 104574521 A | * | 4/2015 |
| CN | 204586658 U | | 8/2015 |
| CN | 105809902 A | | 7/2016 |
| JP | 2006338535 A | * | 12/2006 |
| JP | 2011197778 A | | 10/2011 |
| KR | 20100134297 A | | 12/2010 |
| WO | 2015025435 A1 | | 2/2015 |
| WO | 2015064511 A1 | | 5/2015 |

OTHER PUBLICATIONS

International Search Report and Box V of Written Opinion, for PCT Patent Application No. PCT/CN2017/079462, dated Jun. 28, 2017, 21 pages.

* cited by examiner

METHOD, DEVICE, AND SYSTEM FOR MONITORING TAXI

CROSS-REFERENCE TO RELATED APPLICATIONS

This application is a Section 371 National Stage Application of International Application No. PCT/CN2017/079462, filed on 5 Apr. 2017, entitled "METHOD, DEVICE, AND SYSTEM FOR MONITORING TAXI", which has not yet published, which claims priority to Chinese Application No. 201610228556.5, filed on 13 Apr. 2016, the contents of which are hereby incorporated by reference in their entirety.

BACKGROUND

1. Technical Field

Embodiments of the present invention relate to a method, a device, and a system for monitoring a taxi.

2. Description of the Related Art

Sometimes, a passenger will leave an article in a taxi, and it cannot be known in time that the passenger's article is left in the taxi if the article is left in the taxi.

SUMMARY

Embodiments of the present invention provide a taxi monitoring method comprising:

detecting an operating state of a taxi, the operating state comprising an empty state and a passenger carrying state;

acquiring and recording a first mass of the taxi when it is detected that the taxi is in the empty state and is switched from a running state to a stopped state, acquiring and recording a second mass of the taxi when it is detected that the taxi is switched from the empty state to the passenger carrying state, acquiring and recording a third mass of the taxi when it is detected that the taxi is switched from the running state to the stopped state in the passenger carrying state, and acquiring and recording a fourth mass of the taxi when it is detected that the taxi is switched from the passenger carrying state to the empty state;

finding, as a first difference, a difference between the first mass and the fourth mass of the taxi, and finding, as a second difference, a difference between the second mass and the third mass of the taxi; and comparing the first difference with the second difference, determining that a passenger's article is left in the taxi if the first difference is less than the second difference, and triggering an alarm in the taxi to warn.

Optionally, the method further comprises: reporting alarm information to a monitoring center to which the taxi belongs after it is determined that the passenger's article is left in the taxi, wherein the alarm information comprises at least a vehicle information of the taxi, an alarm time, the first difference, and the second difference.

Optionally, detecting the operating state of the taxi comprises:

acquiring characteristic parameters of organisms in the taxi, and determining the operating state of the taxi according to the characteristic parameters of the organisms, wherein the characteristic parameters of the organisms comprise the number of the organisms, and a position of each of the organisms.

Optionally, acquiring the characteristic parameters of the organisms in the taxi comprises:

acquiring image information in the taxi by means of an image acquisition device, and extracting the characteristic parameters of the organisms from the image information; or acquiring infrared information in the taxi by means of an infrared recognition device, and extracting the characteristic parameters of the organisms from the infrared information.

Optionally, determining the operating state of the taxi according to the characteristic parameters of the organisms comprises:

determining that the operating state of the taxi is the empty state, if the number of the organisms among the characteristic parameters of the organisms is one, and the organism is located at a driver's seat, and determining that the operating state of the taxi is the passenger carrying state, if the number of the organisms among the characteristic parameters of the organisms is greater than one, and one of the organisms is located at the driver's seat.

Embodiments of the present invention also provide a taxi monitoring device, comprising:

a detection unit configured to detect an operating state of the taxi, the operating state comprising an empty state and a passenger carrying state;

an acquisition unit configured to acquire and record a first mass of the taxi when the detection unit detects that the taxi is in the empty state and is switched from a running state to a stopped state, to acquire and record a second mass of the taxi when the detection unit detects that the taxi is switched from the empty state to the passenger carrying state, to acquire and record a third mass of the taxi when the detection unit detects that the taxi is switched from the running state to the stopped state in the passenger carrying state, and to acquire and record a fourth mass of the taxi when the detection unit detects that the taxi is switched from the passenger carrying state to the empty state;

a subtraction unit configured to find, as a first difference, a difference between the first mass and the fourth mass of the taxi which are recorded by the acquisition unit, and to find, as a second difference, a difference between the second mass and the third mass of the taxi which are recorded by the acquisition unit; and a processing unit configured to compare the first difference with the second difference found by the subtraction unit, to determine that a passenger's article is left in the taxi if the first difference is less than the second difference, and to trigger an alarm in the taxi to warn.

Optionally, the processing unit is further configured to report alarm information to a monitoring center to which the taxi belongs after it is determined that the passenger's article is left in the taxi, wherein the alarm information comprises at least a vehicle information of the taxi, an alarm time, the first difference, and the second difference.

Optionally, the detection unit is configured to determine the operating state of the taxi according to characteristic parameters, acquired by the detection unit, of the organisms in the taxi, wherein the characteristic parameters of the organisms comprise the number of the organisms, and a position of each of the organisms.

Optionally, the detection unit comprises:

an image acquisition device configured to acquire image information in the taxi and to extract the characteristic parameters of the organisms from the image information; or an infrared recognition device configured to acquire infrared information in the taxi and to extract the characteristic parameters of the organisms from the infrared information.

Optionally, the detection unit determines that the operating state of the taxi is the empty state, if the number of the organisms among the characteristic parameters of the organisms is one, and the organism is located at a driver's seat, and the detection unit determines that the operating state of the taxi is the passenger carrying state, if the number of the organisms among the characteristic parameters of the organisms is greater than one, and one of the organisms is located at the driver's seat.

Embodiments of the present invention also provide a taxi monitoring system comprising: the taxi monitoring device; and a monitoring center; wherein the monitoring center is configured to receive alarm information reported by the taxi.

BRIEF DESCRIPTION OF THE DRAWINGS

In order to describe technical solutions in embodiments of the present invention more clearly, accompanying drawings required for describing the embodiments will be simply explained as below. Apparently, the accompanying drawings for the following description are only some embodiments of the present invention. Those skilled in the art also could derive other accompanying drawings from these accompanying drawings without making a creative work.

DETAILED DESCRIPTION OF THE EMBODIMENTS

In order that the object, technical solutions and advantages of the present invention are more apparent, a clear and detailed description of the present invention will be further made as below in conjunction with the accompanying drawings. Apparently, the described embodiments are some of the embodiments of the present invention rather than all of the embodiments of the present invention. All other embodiments derived by those skilled in the art based on the embodiments of the present invention without making a creative work shall fall within the protection scope of the present invention.

A detailed description of technical solutions to which the present invention relates will be made as below by means of specific embodiments. The present invention includes, but is not limited to the following embodiments.

Figure 1:
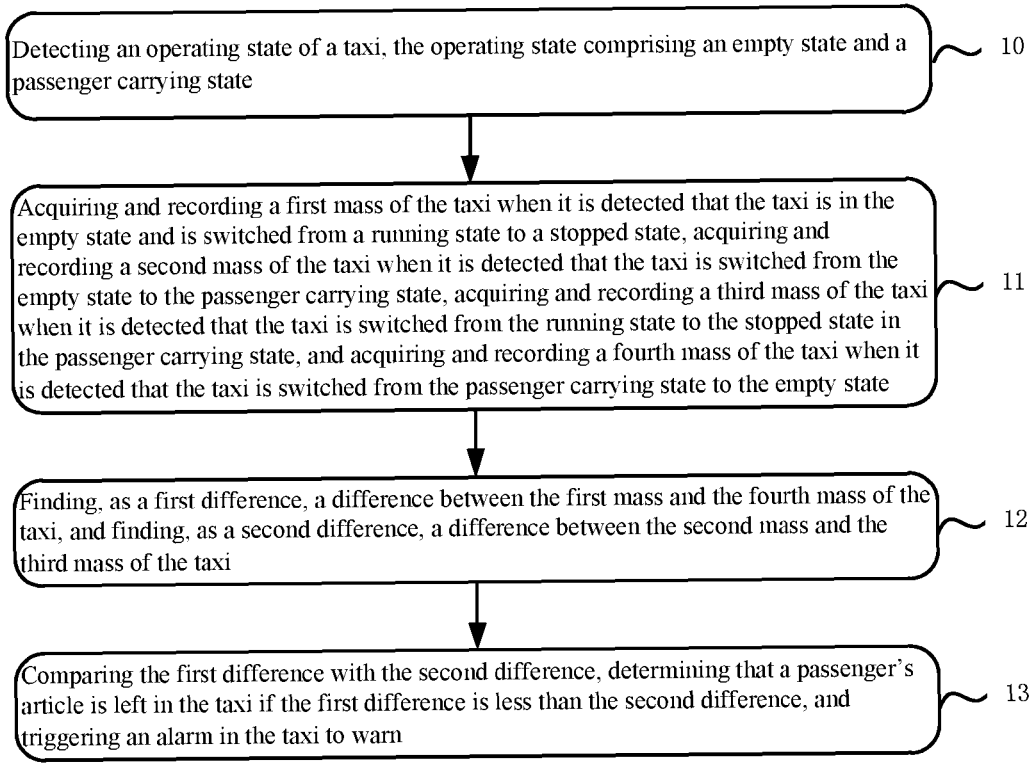
FIG. 1 is a schematic flow diagram of a taxi monitoring method according to embodiments of the present invention.

FIG. 1 is a schematic flow diagram of a taxi monitoring method according to embodiments of the present invention. The method comprises the following steps.

In a step 10, an operating state of a taxi is detected, and the operating state comprises an empty state and a passenger carrying state.

In a step 11, a first mass of the taxi is acquired and recorded when it is detected that the taxi is in the empty state and is switched from a running state to a stopped state, a second mass of the taxi is acquired and recorded when it is detected that the taxi is switched from the empty state to the passenger carrying state, a third mass of the taxi is acquired and recorded when it is detected that the taxi is switched from the running state to the stopped state in the passenger carrying state, and a fourth mass of the taxi is acquired and recorded when it is detected that the taxi is switched from the passenger carrying state to the empty state.

It is to be noted that the main consideration in the embodiments of the present invention is whether or not a passenger taking a taxi leaves an article in the taxi. Therefore, the operating state involved herein only includes: the passenger carrying state where a passenger sits in a taxi and a driver is located in a driving position in the taxi, and the empty state where no passenger sits in the taxi and only the driver is located in the driving position in the taxi. The passenger carrying state and the empty state do not reflect whether or not the taxi is running Therefore, the taxi in the passenger carrying state has the running state and the stopped state, and the taxi in the empty state also has the running state and the stopped state.

In embodiments of the present invention, in the step 11, detecting the operating state of the taxi may comprise: acquiring characteristic parameters of organisms in the taxi, and determining a current operating state of the taxi according to the characteristic parameters of the organisms. The characteristic parameters of the organisms comprise the number of the organisms, and a position of each of the organisms.

According to the embodiments of the present invention, the operating state of the taxi can be accurately determined.

Optionally, acquiring the characteristic parameters of the organisms in the taxi may comprise:

acquiring image information in the taxi by means of an image acquisition device, and extracting the characteristic parameters of the organisms from the image information. For example, a panoramic camera is disposed in the taxi to take image information in the taxi in real time. After the panoramic camera has taken the image information, it may further process the acquired image information. Specifically, information of each of pixels in the image information is analyzed to extract the characteristic parameters of the organisms from the image information. For example, information of sensitive pixels of the pixels is extracted as the characteristic parameters of the organisms.

Alternatively, acquiring the characteristic parameters of the organisms in the taxi may comprise: acquiring infrared information in the taxi by means of an infrared recognition device, and extracting the characteristic parameters of the organisms from the infrared information. For example, an infrared sensing device such as an infrared sensor and the like may be disposed in the taxi to scan scene information in the taxi in real time, thereby acquiring infrared information (organisms with temperatures) in the taxi, and determining the characteristic parameters of the organisms according to the infrared information.

According to the embodiments of the present invention, the characteristic parameters of the organisms can be accurately extracted, thereby improving detection accuracy.

Optionally, determining the current operating state of the taxi according to the characteristic parameters of the organisms may comprise: determining that the operating state of the taxi is the empty state, if the number of the organisms among the characteristic parameters of the organisms is one, and the organism is located at a driver's seat; and determining that the operating state of the taxi is the passenger carrying state, if the number of the organisms among the characteristic parameters of the organisms is greater than one, and one of the organisms is located at the driver's seat.

According to the embodiments of the present invention, the operating state of the taxi can be effectively detected.

In fact, in an actual monitoring solution, the detection may also be performed in other effective manners. For example, a pressure sensor is mounted to each seat. If a passenger sits in a taxi, the pressure sensor in the seat where the passenger sits will sense a corresponding pressure. In this case, the current operating state of the taxi can be determined according to sensed situations of the pressure sensors. Specifically, the sensed situations of the pressure sensors in the seats are analyzed. If only the pressure sensor in the seat where the driver sits senses a pressure, it is determined that currently the taxi is in the empty state. If in addition to the pressure sensor in the seat where the driver sits sensing the pressure, the pressure sensor in at least one of the other seats senses a pressure, it is determined that currently the taxi is in the passenger carrying state.

In an actual monitoring solution, it is probable that the taxi is continuously in the operating state, and is continually switched between the passenger carrying state and the empty state. Therefore, it can be understood that a mass of the taxi itself is monitored in real time. The weight of the taxi itself may be a mass of the entire taxi except tires, and includes those of a passenger and a driver in the taxi, and of articles carried by the taxi. The mass of the taxi may be monitored by an acquisition unit, such as a mass sensing device, a sensor, or a pressure sensor, which is disposed at a chassis or a tire of the taxi. Furthermore, in embodiments of the present invention, considering that a warning will be performed mainly in a situation where a passenger leaves an article in the taxi in the embodiments of the present invention, a detection accuracy of the mass sensing device is set to be relatively high. For example, a mass difference of 50 g can be detected, so that even if a passenger leaves an article of light weight such as a wallet in a taxi, the taxi can accurately warn.

Figure 2:
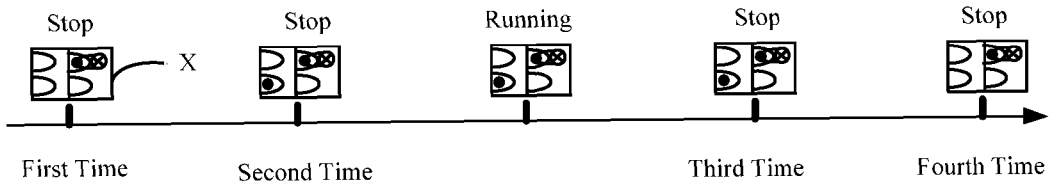
FIG. 2 is a schematic diagram showing switching among operating states of the taxi in an operating period.

In the step 11, the above-mentioned detection solution is used. If it is detected that currently the taxi is in the empty state, the masses of the taxi at the following four times can be acquired with the empty state as an initial state, as shown in FIG. 2. A driver is denoted by a black dot on an upper right side in the taxi in FIG. 2, while a passenger is denoted by a black dot on a lower left side in the taxi in FIG. 2. It is indicated that the taxi is in the passenger carrying state when there is the black dot on the lower left side, while it is indicated that the taxi is in the empty state when there is not the black dot on the lower left side.

At a first time, a first mass of the taxi is acquired and recorded when it is detected that the taxi is in the empty state and is switched from a running state to a stopped state.

At a second time, a second mass of the taxi is acquired and recorded when it is detected that the taxi is switched from the empty state to the passenger carrying state.

At a third time, a third mass of the taxi is acquired and recorded when it is detected that the taxi is switched from the running state to the stopped state in the passenger carrying state.

At a fourth time, a fourth mass of the taxi is acquired and recorded when it is detected that the taxi is switched from the passenger carrying state to the empty state.

In addition, between the second time and the third time, the taxi is in a running stage.

In a step 12, a difference between the first mass and the fourth mass of the taxi is found as a first difference, and a difference between the second mass and the third mass of the taxi is found as a second difference.

In the embodiments of the present invention, the difference between the first mass and the fourth mass in the step 11 is determined because it is considered that oil consumption is also a part of mass loss during running of the taxi. Therefore, when the passenger leaves an article in the taxi, it is necessary to compare net weights of the taxi with each other after the oil consumption is subtracted. Hence, in the embodiments of the present invention, it is necessary to firstly determine, as an initial mass of the taxi, the first mass of the taxi before the taxi runs in the empty state; and to finally determine, as a final mass of the taxi, the fourth mass of the taxi after the taxi stops in the empty state. Ideally, a difference between the initial mass and the final mass (the difference between the first mass and the fourth mass) should be a mass of oil consumption of the taxi. However, considering that a passenger probably leaves an article in the taxi, the difference between the initial mass and the final mass is less than the mass of the oil consumption. In a whole running process, the mass of the oil consumption is equal to the difference between the second mass of the taxi acquired after the taxi enters the passenger carrying state and before the taxi has not yet run and the third mass of the taxi acquired after the taxi stops in the passenger carrying state. In addition, although the taxi using oil as fuel is described, the taxi monitoring method, and a taxi monitoring device and a taxi monitoring system (to be described below) according to the embodiments of the present invention are also applicable to other taxis using a battery, fuel gas, and the like.

In a step 13, the first difference is compared with the second difference, it is determined that a passenger's article is left in the taxi if the first difference is less than the second difference, and an alarm in the taxi is triggered to warn.

According to the embodiments of the present invention, the passenger and a driver can be effectively notified in time that the passenger leaves an article in the taxi, thereby avoiding causing a loss to the passenger.

It can be known from the step 12 that the difference between the initial mass and the final mass (the difference between the first mass and the fourth mass, i.e. the first difference) is compared with the mass of the oil consumption (the difference between the second mass and the third mass, i.e. the second difference). If the first difference is greater than the second difference, then it is indicated that the passenger has gotten off from the taxi and has probably taken an article (for example, an article for being temporarily read by a passenger in the taxi, such as a magazine, a book, and the like) that does not belong to her/him from the taxi. In this case, the alarm in the taxi may also be triggered to warn. If the first difference is equal to the second difference, then it is indicated that the passenger does not leave an article in the taxi and it is not necessary to trigger the alarm in the taxi to warn. If the first difference is less than the second difference, then it is indicated that the passenger's article, such as a wallet, a shopping bag, luggage and the like, is left in the taxi and thus the alarm in the taxi will be triggered to warn.

It is to be noted that in order to facilitate notifying both the passenger and the driver, the alarm may be disposed at a vehicle door. After the passenger opens the vehicle door and gets off and before he/she has not yet closed the vehicle, the step 13 is performed in time and the alarm is triggered to warn, so that it is ensured that both the passenger and the driver can be notified of the warning and possible losses to oneself and the other are avoided in time. Furthermore, specifically, for ease of identification of types of the warning, different warning sounds may be triggered according to different results analyzed in the step 13. For example, the alarm may be triggered to utter a first warning sound "you accidentally take an article from the taxi" if the first difference is greater than the second difference, and the alarm may be triggered to utter a second warning sound "you accidentally leave your article in the taxi" if the first difference is less than the second difference. Similar types of warnings may also be distinguished in other ways, for example by different types of music, different types of audio information, or in other distinguishing manner defined by oneself.

Optionally, in consideration of existence of various emergencies, the passenger probably gets off from the taxi in a hurry, or the alarm fails so that it cannot achieve a warning function in time. Therefore, the method may further comprise: reporting alarm information to a monitoring center to which the taxi belongs after it is determined that the passenger's article is left in the taxi. The alarm information comprises at least vehicle information of the taxi, an alarm time, the first difference, and the second difference. Therefore, the alarm information can be recorded and stored by the monitoring center, so that when the passenger looks for the article, he/she can inquire out information of the taxi through the alarm information. As a result, the passenger easily finds the lost article quickly.

According to the embodiments of the present invention, it can be effectively monitored whether or not the passenger's article is left in the taxi, and the passenger is helped to find the article in appropriate situations.

Embodiments of the present invention will be expounded in detail by means of specific examples as below.

It is assumed that image information in the taxi is acquired by a camera disposed in the taxi in real time, characteristic parameters of organisms are analyzed and extracted from the image information, and an operating state of the taxi is detected according to the characteristic parameters of the organisms. A current mass G1 of the taxi is acquired and stored when it is detected that the taxi is in an empty state and is switched from a running state to a stopped state, a current mass G2 of the taxi is acquired and stored when it is detected that the taxi is switched from the empty state to a passenger carrying state, a current mass G3 of the taxi is acquired and stored when it is detected that the taxi is switched from the running state to the stopped state in the passenger carrying state, and a mass G4 of the taxi is acquired and stored when it is detected that the taxi is switched from the passenger carrying state to the empty state. Then, a mass G2-G3 of oil consumption of the taxi during the running is determined from the mass G2 and the mass G3 of the taxi, and a mass G1-G4 of the taxi in the empty state before and after the taxi carries the passenger is determined according to the mass G1 and the mass G4 of the taxi. If the mass G1-G4 is less than the mass G2-G3, the alarm in the taxi is triggered to warn. Meanwhile, alarm information may also be sent to the monitoring center.

Embodiments of the present invention also provide a taxi monitoring device belonging to the same inventive concept as the taxi monitoring method according to the embodiments of the present invention. The taxi monitoring device is mainly mounted to a taxi, and is supplied with power by a power supply system in the taxi.

Figure 3:
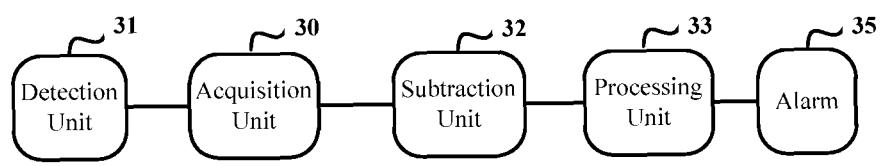
FIG. 3 is a schematic diagram of a taxi monitoring device according to embodiments of the present invention.

FIG. 3 is a schematic diagram of a taxi monitoring device according to embodiments of the present invention. The taxi monitoring device mainly comprises:

a detection unit 31 configured to detect an operating state of the taxi, the operating state comprising an empty state and a passenger carrying state; and an acquisition unit 30 configured to acquire and record a first mass of the taxi when the detection unit 31 detects that the taxi is in the empty state and is switched from a running state to a stopped state, to acquire and record a second mass of the taxi when the detection unit 31 detects that the taxi is switched from the empty state to the passenger carrying state, to acquire and record a third mass of the taxi when the detection unit 31 detects that the taxi is switched from the running state to the stopped state in the passenger carrying state, and to acquire and record a fourth mass of the taxi when the detection unit 31 detects that the taxi is switched from the passenger carrying state to the empty state. Specifically, in embodiments of the present invention, a storage unit may further be disposed in the detection unit 31 or a storage unit that is separate from the detection unit may further be disposed, to store the masses of the taxi acquired in the above four detection states.

The taxi monitoring device further comprises: a subtraction unit 32 configured to find, as a first difference, a difference between the first mass and the fourth mass of the taxi which are recorded by the acquisition unit 30, and to find, as a second difference, a difference between the second mass and the third mass of the taxi; and a processing unit 33 configured to compare the first difference with the second difference found by the subtraction unit, to determine that a passenger's article is left in the taxi if the first difference is not greater than the second difference, and to trigger an alarm 35 in the taxi to warn.

According to the embodiments of the present invention, the passenger and a driver can be effectively notified in time that the passenger leaves an article in the taxi, thereby avoiding causing a loss to the passenger.

Optionally, in embodiments of the present invention, the processing unit 33 is further configured to report alarm information to a monitoring center to which the taxi belongs after it is determined that the passenger's article is left in the taxi. The alarm information comprises at least vehicle information of the taxi, an alarm time, the first difference, and the second difference.

According to the embodiments of the present invention, it can be effectively monitored whether or not the passenger's article is left in the taxi, and the passenger is helped to find the article in appropriate situations.

Optionally, in embodiments of the present invention, the detection unit 31 is configured to determine the operating state of the taxi according to characteristic parameters, acquired by the detection unit, of the organisms in the taxi. The characteristic parameters of the organisms comprise the number of the organisms, and a position of each of the organisms.

According to the embodiments of the present invention, the operating state of the taxi can be effectively detected.

Optionally, the detection unit 31 comprises: an image acquisition device configured to acquire image information in the taxi and to extract the characteristic parameters of the organisms from the image information; or an infrared recognition device configured to acquire infrared information in the taxi and to extract the characteristic parameters of the organisms from the infrared information.

According to the embodiments of the present invention, the characteristic parameters of the organisms can be accurately extracted, thereby improving detection accuracy.

Optionally, the detection unit 31 determines that the operating state of the taxi is the empty state, if the number of the organisms among the characteristic parameters of the organisms is one, and the organism is located at a driver's seat, and the detection unit 31 determines that the operating state of the taxi is the passenger carrying state, if the number of the organisms among the characteristic parameters of the organisms is greater than one, and one of the organisms is located at the driver's seat.

According to the embodiments of the present invention, the operating state of the taxi can be accurately determined.

Figure 4:
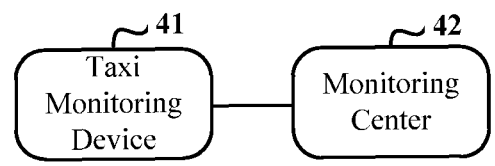
FIG. 4 is a schematic diagram of a taxi monitoring system according to embodiments of the present invention.

In addition, embodiments of the present invention also provide a taxi monitoring system. As shown in FIG. 4, the taxi monitoring system comprises the taxi monitoring device 41 to which the abovementioned embodiments relate, and a monitoring center 42. The monitoring center 42 is configured to receive alarm information reported by the taxi where the taxi monitoring device 41 is located. In the embodiments of the present invention, a communication is established between the monitoring center 42 and the taxi monitoring device 41 through a mobile network or other wireless network.

The embodiments of the present invention provide a method, a device, and a system for monitoring a taxi, thereby at least partly relieving the problem that it cannot be known in time that a passenger's article is left in a taxi.

In the embodiments of the present invention, the operating state of the taxi is detected, and then the first, second, third and fourth masses of the taxi are acquired and recorded in different operating states, respectively. A difference between the first mass and the fourth mass of the taxi is found as a first difference, and a difference between the second mass and the third mass of the taxi is found as a second difference. The first difference is compared with the second difference, it is determined that a passenger's article is left in the taxi if the first difference is less than the second difference, and an alarm in the taxi is triggered to warn. Therefore, the passenger can be notified by warning immediately after it is determined that the passenger's article is left in the taxi, thereby avoiding causing a loss to the passenger conveniently and quickly.

A person having ordinary skill in the art should appreciate that the embodiments of the present invention may be provided as method(s), system(s), or computer program product(s). Accordingly, the present invention may take the form of a completely hardware-based embodiment, a completely software-based embodiment, or an embodiment based on a combination of software and hardware. Furthermore, the embodiments of present invention may take the form of a computer program product implemented on one or more computer-usable storage media (which include but are not limited to disk storages, CD-ROMs, optical storages, etc.) in which computer-usable program codes are included.

The present invention is described with reference to the flow diagram and/or the block diagram of the method, the device (system), and the computer program product according to the embodiments of the present invention. It is to be understood that computer program instructions may be used to achieve each flow and/or each block in the flow diagram and/or the block diagram, as well as a combination of a flow and/or a block in the flow diagram and/or the block diagram. These computer program instructions may be provided to a processor of a general-purpose computer, a special-purpose computer, an embedded computer, or other programmable data processing device to produce a machine, so that instructions executed by the processor of the computer or the other programmable data processing device generate means for achieving functions specified in one or more flows of the flow diagram and/or one or more blocks of the block diagram.

These computer program instructions may also be stored in a computer-readable memory that is capable of guiding an operation of a computer or other programmable data processing devices in a particular manner, such that the instructions stored in the computer-readable memory produces a product that includes a command device which achieves function(s) specified in one or more flows of the flow diagram and/or one or more blocks of the block diagram.

These computer program instructions may also be loaded into a computer or other programmable data processing devices such that a series of operational steps are performed by the computer or the other programmable data processing devices to produce a computer-implemented processing. As a result, instructions that are performed by the computer or the other programmable data processing devices provide steps for achieving function(s) specified in one or more flows of the flow diagram and/or one or more blocks of the block diagram.

Although the embodiments of the present disclosure have been described, it would be appreciated by a person skilled in the art that many other modifications and changes can be made. Therefore, the appended claims are intended to be construed to include the embodiments and all of the modifications and changes falling within the scope of the present disclosure.

Apparently, it will be understood by those skilled in the art that various changes and modifications may be made without departing from the spirit and scope of the embodiments of the present disclosure. Therefore, if the changes and modifications of the present disclosure belong to the scope defined in the appended claims of the present invention and their equivalents, the present invention is intended to include the changes and modifications.

What is claimed is:

1. A taxi monitoring method comprising:
   detecting an operating state of a taxi, the operating state comprising one of an empty state and a passenger carrying state;
   acquiring and recording a first mass of the taxi when it is detected that the taxi is in the empty state and is switched from a running state to a stopped state, acquiring and recording a second mass of the taxi when it is detected that the taxi is switched from the empty state to the passenger carrying state, acquiring and recording a third mass of the taxi when it is detected that the taxi is switched from the running state to the stopped state in the passenger carrying state, and acquiring and recording a fourth mass of the taxi when it is detected that the taxi is switched from the passenger carrying state to the empty state;
   finding, as a first difference, a difference between the first mass and the fourth mass of the taxi, and finding, as a second difference, a difference between the second mass and the third mass of the taxi; and
   comparing the first difference with the second difference, determining that a passenger's article is left in the taxi if the first difference is less than the second difference, and triggering an alarm in the taxi to warn.

2. The method of claim 1, further comprising:
   reporting alarm information to a monitoring center to which the taxi belongs after it is determined that the passenger's article is left in the taxi,
   wherein the alarm information comprises at least vehicle information of the taxi, an alarm time, the first difference, and the second difference.

3. The method of claim 1, wherein detecting the operating state of the taxi comprises:
   acquiring characteristic parameters of organisms in the taxi, and determining the operating state of the taxi according to the characteristic parameters of the organisms,
   wherein the characteristic parameters of the organisms comprise a number of the organisms, and a position of each of the organisms.

4. The method of claim 3, wherein acquiring the characteristic parameters of the organisms in the taxi comprises:
acquiring image information in the taxi by means of an image acquisition device, and extracting the characteristic parameters of the organisms from the image information; or
acquiring infrared information in the taxi by means of an infrared recognition device, and extracting the characteristic parameters of the organisms from the infrared information.

5. The method of claim 3, wherein determining the operating state of the taxi according to the characteristic parameters of the organisms comprises:
determining that the operating state of the taxi is the empty state, if the number of the organisms among the characteristic parameters of the organisms is one and the organism is located at a driver's seat, and
determining that the operating state of the taxi is the passenger carrying state, if the number of the organisms among the characteristic parameters of the organisms is greater than one and one of the organisms is located at the driver's seat.

6. A taxi monitoring device, comprising:
a detection unit configured to detect an operating state of a taxi, the operating state comprising one of an empty state and a passenger carrying state;
an acquisition unit configured to acquire and record a first mass of the taxi when the detection unit detects that the taxi is in the empty state and is switched from a running state to a stopped state, to acquire and record a second mass of the taxi when the detection unit detects that the taxi is switched from the empty state to the passenger carrying state, to acquire and record a third mass of the taxi when the detection unit detects that the taxi is switched from the running state to the stopped state in the passenger carrying state, and to acquire and record a fourth mass of the taxi when the detection unit detects that the taxi is switched from the passenger carrying state to the empty state;
a subtraction unit configured to find, as a first difference, a difference between the first mass and the fourth mass of the taxi which are recorded by the acquisition unit, and to find, as a second difference, a difference between the second mass and the third mass of the taxi which are recorded by the acquisition unit; and
a processing unit configured to compare the first difference with the second difference found by the subtraction unit, to determine that a passenger's article is left in the taxi if the first difference is less than the second difference, and to trigger an alarm in the taxi to warn.

7. The device of claim 6, wherein:
the processing unit is further configured to report alarm information to a monitoring center to which the taxi belongs after it is determined that the passenger's article is left in the taxi,
wherein the alarm information comprises at least vehicle information of the taxi, an alarm time, the first difference, and the second difference.

8. The device of claim 6, wherein:
the detection unit is configured to determine the operating state of the taxi according to characteristic parameters, acquired by the detection unit, of organisms in the taxi,
wherein the characteristic parameters of the organisms comprise a number of the organisms, and a position of each of the organisms.

9. The device of claim 8, wherein the detection unit comprises:
an image acquisition device configured to acquire image information in the taxi, and to extract the characteristic parameters of the organisms from the image information; or
an infrared recognition device configured to acquire infrared information in the taxi, and to extract the characteristic parameters of the organisms from the infrared information.

10. The device of claim 8, wherein:
the detection unit determines that the operating state of the taxi is the empty state, if the number of the organisms among the characteristic parameters of the organisms is one and the organism is located at a driver's seat, and
the detection unit determines that the operating state of the taxi is the passenger carrying state, if the number of the organisms among the characteristic parameters of the organisms is greater than one and one of the organisms is located at the driver's seat.

11. A taxi monitoring system comprising:
the taxi monitoring device according to claim 6; and
a monitoring center;
wherein the monitoring center is configured to receive alarm information reported by the taxi.

* * * * *